United States Patent
Yarnell et al.

(10) Patent No.: US 9,292,562 B2
(45) Date of Patent: Mar. 22, 2016

(54) SCATTER-GATHER LIST USAGE FOR A CONFIGURATION DATABASE RETRIEVE AND RESTORE FUNCTION AND DATABASE BLOCKING AND CONFIGURATION CHANGES DURING A DATABASE RESTORE PROCESS

(75) Inventors: Gregory A. Yarnell, Wichita, KS (US); Douglas A. Ochsner, Wichita, KS (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 821 days.

(21) Appl. No.: 12/971,355

(22) Filed: Dec. 17, 2010

(65) Prior Publication Data
US 2012/0158682 A1    Jun. 21, 2012

(51) Int. Cl.
*G06F 17/30* (2006.01)

(52) U.S. Cl.
CPC .............................. *G06F 17/30362* (2013.01)

(58) Field of Classification Search
CPC ..................... G06F 17/30289; G06F 17/30362; G06F 17/30
USPC .......................................................... 707/704
See application file for complete search history.

(56) References Cited

U.S. PATENT DOCUMENTS

| | | | |
|---|---|---|---|
| 5,652,865 A * | 7/1997 | Rawlings, III ........ | G06F 3/0613 707/999.101 |
| 6,704,737 B1 * | 3/2004 | Nixon et al. .................. | 707/656 |
| 7,062,501 B1 * | 6/2006 | Young .................... | G06F 13/385 |
| 8,065,439 B1 * | 11/2011 | Johnson ................ | H04L 1/0043 709/217 |
| 8,176,252 B1 * | 5/2012 | Alexander et al. ............ | 711/118 |
| 2004/0117496 A1 * | 6/2004 | Mittal ...................... | H04L 29/06 709/230 |
| 2005/0028044 A1 * | 2/2005 | Paulsen ................. | G06F 11/221 714/43 |
| 2007/0016743 A1 * | 1/2007 | Jevans ..................... | G06F 21/31 711/164 |
| 2007/0266206 A1 * | 11/2007 | Kim et al. ...................... | 711/118 |
| 2008/0040519 A1 * | 2/2008 | Starr et al. ...................... | 710/39 |
| 2008/0301256 A1 * | 12/2008 | McWilliams et al. ........ | 709/214 |
| 2009/0187599 A1 * | 7/2009 | Bruso ............... | G06F 17/30312 |
| 2009/0271226 A1 * | 10/2009 | De Marcken ..................... | 705/5 |
| 2011/0145447 A1 * | 6/2011 | Dimond .................. | G06F 13/28 710/23 |

* cited by examiner

*Primary Examiner* — James Trujillo
*Assistant Examiner* — Fatima Mina

(57) ABSTRACT

Disclosed is a method of reading and writing data to and from a transactional database using a scatter-gather routine that minimizes the time in which the database is subject to a transaction lock. Data is placed in a scatter-gather list in RAM, which speeds the process of reading and writing data to the database. Further, a process is disclosed for restoring data in a transactional database that is accessed by more than one controller. An alternate controller is held in reset mode and placed offline, so that data in the transactional database cannot be changed during the restoration process. In addition, the database is placed offline and the host is notified that the database is invalid, so that the host cannot access the transactional database.

23 Claims, 7 Drawing Sheets

SCATTER-GATHER LIST USAGE FOR A CONFIGURATION DATABASE RETRIEVE AND RESTORE FUNCTION AND DATABASE BLOCKING AND CONFIGURATION CHANGES DURING A DATABASE RESTORE PROCESS

BACKGROUND

Transactional databases are capable of providing a large amount of data to network computer systems. Advances in RAID technology and optimization of various database systems have allowed quick and convenient access to a large amount of data. In addition, improvements in database management and access to data have also increased the usability of database systems.

SUMMARY OF THE INVENTION

An embodiment of the present invention may therefore comprise a method of reading a data set from a transactional database by a host comprising: generating a read instruction from the host for the data set; generating a transaction lock that locks the transactional database; applying a scatter-gather routine to the data set that divides the data set into a plurality of subsets of data that are identified by a scatter-gather list; storing the subsets of data in random access memory in accordance with the scatter-gather list; releasing the transaction lock from the transactional database after the subsets of data are stored in the random access memory; reading the subsets of data from the random access memory to the host.

An embodiment of the present invention may further comprise a method of writing a data set from a host to a transactional database comprising: applying a scatter-gather routine to the data set that divides the data set into a plurality of subsets of data that are identified by a scatter-gather list; storing the subsets of data in random access memory in accordance with the scatter-gather list; generating a transaction lock that locks the transactional database; transferring the subsets of data that are stored in the random access memory to the transactional database; releasing the transactional lock from the transactional database after the subsets of data are transferred from the random access memory to the transactional database.

An embodiment of the present invention may further comprise a system for reading a data set from, and writing a data set to, a transactional database comprising: a host that generates read and write instructions, to read the data set from, and write the data set to, the transactional database; a controller comprising: a processor that operates a database manager that applies a transaction lock to the transactional database while the data set is being written to, or read from, said transactional database and generates a scatter-gather list that divides the data set into a plurality of subsets of data; random access memory that stores the plurality of subsets of data while said data set is being read from, and written to, the transactional database in accordance with the scatter-gather list.

An embodiment of the present invention may further comprise a method of stopping changes to a configuration database, that is accessed by at least two controllers, while the configuration database is being restored to a previous state comprising: invalidating a current configuration of the configuration database to lock all user commands that could change the current configuration; marking the configuration database as being offline so that users cannot make changes during restoration of the configuration database; holding all associated controllers, of the at least two controllers that are not restoring the configuration database, in reset mode so that the associated controllers are prevented from making changes to the configuration database.

DETAILED DESCRIPTION OF THE PREFERRED EMBODIMENTS

Figure 1:
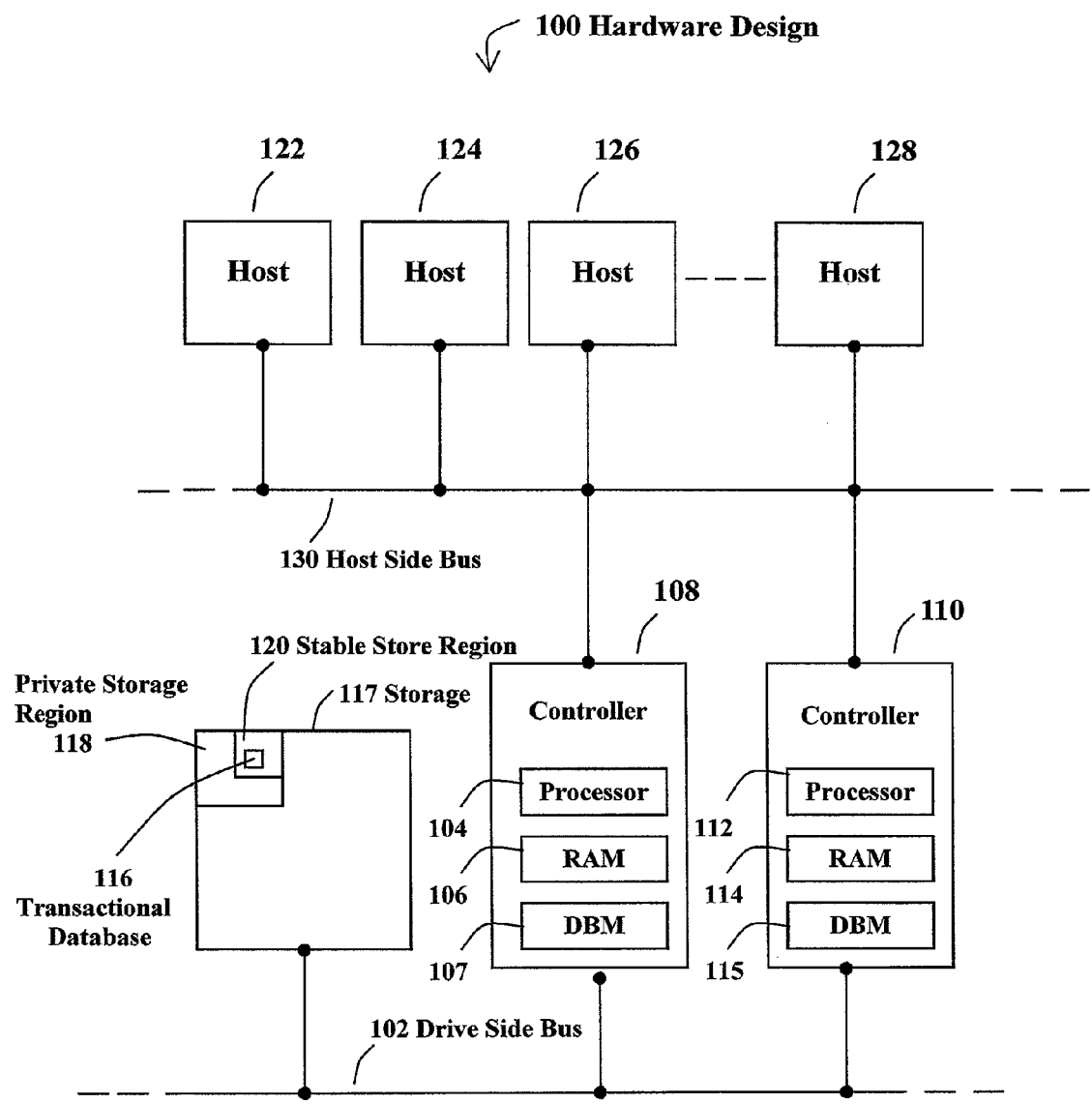
FIG. 1 is a schematic illustration of one embodiment of a hardware diagram for carrying out aspects of the present invention.

FIG. 1 is a schematic illustration of a hardware diagram 100. The hardware diagram 100 includes a drive side bus 102 that interconnects a storage device 117 with dual controllers 108,110. Storage device 117 includes a private storage region (DACStore) 118. Within the private storage region 118 is a stable storage region 120. Within the stable storage region is a transactional database 116. Controller 108 includes a processor 104, a random access memory 106 and a database manager module 107. Controller 110 includes a processor 112, a random access memory 114 and a database manager module 115. Controller 108 and controller 110 are also connected to a host side bus 130. Host side bus 130 interconnects hosts 122, 124, 126, 128. Hosts 122-128 can be directly connected to controllers 108, 110 through an Ethernet connection or through various types of network connections. The hardware design 100 is established to allow hosts 122-128 to read and write data to the transactional database 116.

Stable store region 120 contains the data of the transactional configuration database that is managed by database manager modules 107, 115 that are resident in controllers 108, 110, respectively, and that control access by the hosts 122-128 to the transactional database 116. The private storage region 118, for example, may contain as much as 512 megabytes, while the stable storage region 120 may have as much as 80 megabytes of storage, which stores the transactional configuration database. The transactional configuration database 116 stored in stable store region 120 is the data that provides the configuration of the array-. For example, the transactional configuration database data may store the logical address and physical address layout of the volume groups accessible by hosts 122-128. The database manager modules 107, 115 interact with the transactional configuration database to allow multiple changes to be made to the transactional database 116 substantially simultaneously. The data in the transactional configuration database includes a data protection layer, in which parity data is stored in the private storage region 118 that is not accessible by hosts 122-128. The database manager modules 107, 115 also function as an interface for various clients, such as hosts 122-128, to handle read and write operations between hosts 122-128 and the transactional database 116. If there is corruption in the stable store region 120 of the data that comprises the transactional configuration database, there will be a loss of array configuration information.

The processes of data storage and retrieval in the transactional database 116 require that a set of data either be retrieved or stored during a time period in which no other changes are made to the transactional database 116. In order to extract a consistent block (data set) of selected client records, access to the transactional database 116 must be locked. Of course, hosts 122-128 may be very slow in the process of reading and writing data to transactional database 116. When a large block of data is to be transferred between the transactional database 116 and hosts 122-128, the transactional database 116 can be locked for a substantial time period. In order to avoid such a delay, blocks of cache memory can be allocated in RAM 106 or RAM 114 that store the large block of data in smaller data subsets. The use of scatter-gather techniques to store the data in RAM 106 and access the stored data by hosts 122-128 can further speed the access and retrieval of data on drive side bus 102 and host side bus 130. Scatter-gather techniques are a type of memory addressing that is used when addressing vectors in sparse linear algebra operations. The memory addressing is a vector equivalent of register indirect addressing with gather processes involving index reads and scatter processes involving index writes. A scatter-gather list is a link list of pointers to small subsets of memory in which each entry on the link list describes where a subset of data is located and how much data is present. Data can be accessed or retrieved by simply accessing each entry on the list sequentially. For example, the first item on the scatter-gather link list may be a pointer to the first subset of data that is stored in RAM 106 or RAM 114. One of the hosts, of hosts 122-128, that initiated a read instruction can then read the first piece of data from RAM 106 or RAM 114 and store that data in one of that host. The next pointer on the list then accesses the next subset of data stored in RAM 106 or RAM 114, so that the host can then read that data from RAM. In this manner, the transactional database 116 can rapidly store the requested data that was requested by one of the hosts 122-128 in RAM 106 or RAM 114, and the transactional database 116 is only locked for a short time period during which the data from the transactional database 116 is stored in RAM 106 or RAM 114. The host can then access the data from RAM 106 or RAM 114 at its leisure.

In other words, if host 122 generates a read call of a large set of data from transactional database 116 and controller 108 controls the read operation, the database manager 107 will control the process of rapidly downloading the large set of data from the transactional database 116 to the RAM 106 in a single transaction during a transaction lock of the transactional database 116. This process is done quickly so that other operations of the processor 104 are not interrupted. The database manager 107 utilizes the cache module 224 (FIG. 2) that generates a scatter-gather list that divides the larger set of data into a number of smaller subsets of data that are stored in a linked list indicating the location and size of each of the subsets of data. The transaction lock can then release the transactional database 116 as soon as the large set of data is stored in the scatter-gather lists in RAM 106. Since this is done quickly, the transactional database 116 is only locked for a short duration. The transactional lock, of course, does not allow any changes to the transactional database 116 by hosts 124-128. RAM 106 then holds the data in the scatter-gather list until host 122 is ready to read the data. The host 122 can then access each subset of data in a sequential manner using the scatter-gather list, which tracks the location and size of the data. After each subset of data is accessed and stored by host 122, host 122 can then read the next subset of data from RAM 106. Host 122 continues this process until host 122 has retrieved all of the data from RAM 106. In this manner, host 122 can access and read the data stored in RAM 106 at its leisure, without locking the transactional database 116, which prevents access to the transactional database 116 by other hosts 124-128.

A similar process is used during "write" operations. When a host, such as host 122, of hosts 122-128, desires to write a large set of data to the transactional database 116, the database manager 107 or 115, depending upon the controller 108, 110 that is controlling the process, sequentially stores the data from the host 122 in a scatter-gather list in RAM 106 or RAM 114. The host 122 provides the data to RAM 106 or RAM 114 at its leisure until all of the data is stored in RAM 106 or RAM 114. A transaction lock is then applied to the transactional database 116 and the data can be written to the transactional database 116 at a high rate of speed, as it is read from the scatter-gather list, under the operation of database manager 107 or database manager 115, again, depending upon the controller 108, 110 that is controlling the process.

Accordingly, the two controllers 108, 110 perform the functions of reading and writing data to the transactional database 116. Additional controllers can also be used to transfer data between the hosts 122-128 and transactional database 116. As such, there must be coordination between the controllers, such as controllers 108, 110. In that regard, processors 104, 112 of controllers 108, 110, respectively, communicate via drive side bus 102 to coordinate the access to the transactional database 116 using database manager 107 of controller 108 and database manager 115 of controller 110. Alternatively, a single database manager can be used to control two or more controllers. Additionally, hosts 122-128 can either be hooked directly to individual controllers through Ethernet connections or connected as shown in FIG. 1 to multiple controllers via host side bus 130. Other configurations can also be used to couple the hosts 122-128 to one or more controllers and one or more database managers.

Each of the controllers 108, 110 is capable of changing array configuration information stored in the transactional configuration database in the stable store region 120. Again, database managers 107, 115 control the layout of the transactional configuration database in the stable store region 120. Corruption or loss of data in the transactional configuration database results in loss of array configuration information during a restoration process of the transactional configuration database. Changes by the controller or any of the hosts 122-124 via the controller that is not performing the restoration process must not be allowed. In that regard, multiple steps are taken to ensure that no changes get made in the transactional configuration database during a restoration process. The first step is to invalidate the configuration, which blocks all user commands that could change the current configuration. By invalidating the configuration, requests from the host to change the configuration are not recognized. In that regard, the host is notified that the transactional configuration database is invalid and the host cannot access and change the transactional database 116. For example, the host is unable to change the volume groups.

The next step is to mark the database as being offline, so that database clients, such as software modules in controllers 108, 110 other than DBM 107 and DBM 115, cannot make changes during the restoration process.

The third step is to hold the alternate controller in reset mode, so that the alternate controller cannot make changes to the restoration configuration database. In other words, the alternate controller, i.e., the controller that is not restoring the restoration configuration database, is placed in reset mode, so that the alternate controller cannot perform any functions, while the restoration process by the primary controller is taking place.

In order to restore a valid and consistent database, no changes should be made to the database while the restoration process is in progress. Using the three steps, set forth above, ensures that changes cannot be made to the transactional database 116 during the restoration process. These three steps are clearly more powerful than just applying a transaction lock to the transactional database 116. Using these three steps, there is essentially no chance that corruption of the data can occur. The reason for carrying out the restoration process for restoring data is the result of the occurrence of a disaster or other problem that caused the corruption of the data initially. Accordingly, restoration of the data to a valid state without any further corruption is beneficial. Although transaction locks normally stop transactions from happening in the transactional database 116, transaction locks do not stop the hosts 122-128 or controllers 108, 110 from attempting to make changes. By taking the alternate controller offline, attempts to change the transactional database 116 are stopped. Further, the transaction lock, when applied to the transactional database 116, may not stop a transaction from taking place if there are communication problems between controller 108 and controller 110. By completely taking one of the controllers offline, i.e., the alternative controller, there is no chance that the alternate controller can make changes to the data. Communication problems can occur, for example, if problems exist in the hardware communication line. In that case, one controller may consider the other controller to have completed its functions when the other controller really has not finished, and start accessing the transactional database 116 and writing data to the transactional database, and further corrupt the data.

Figure 2:
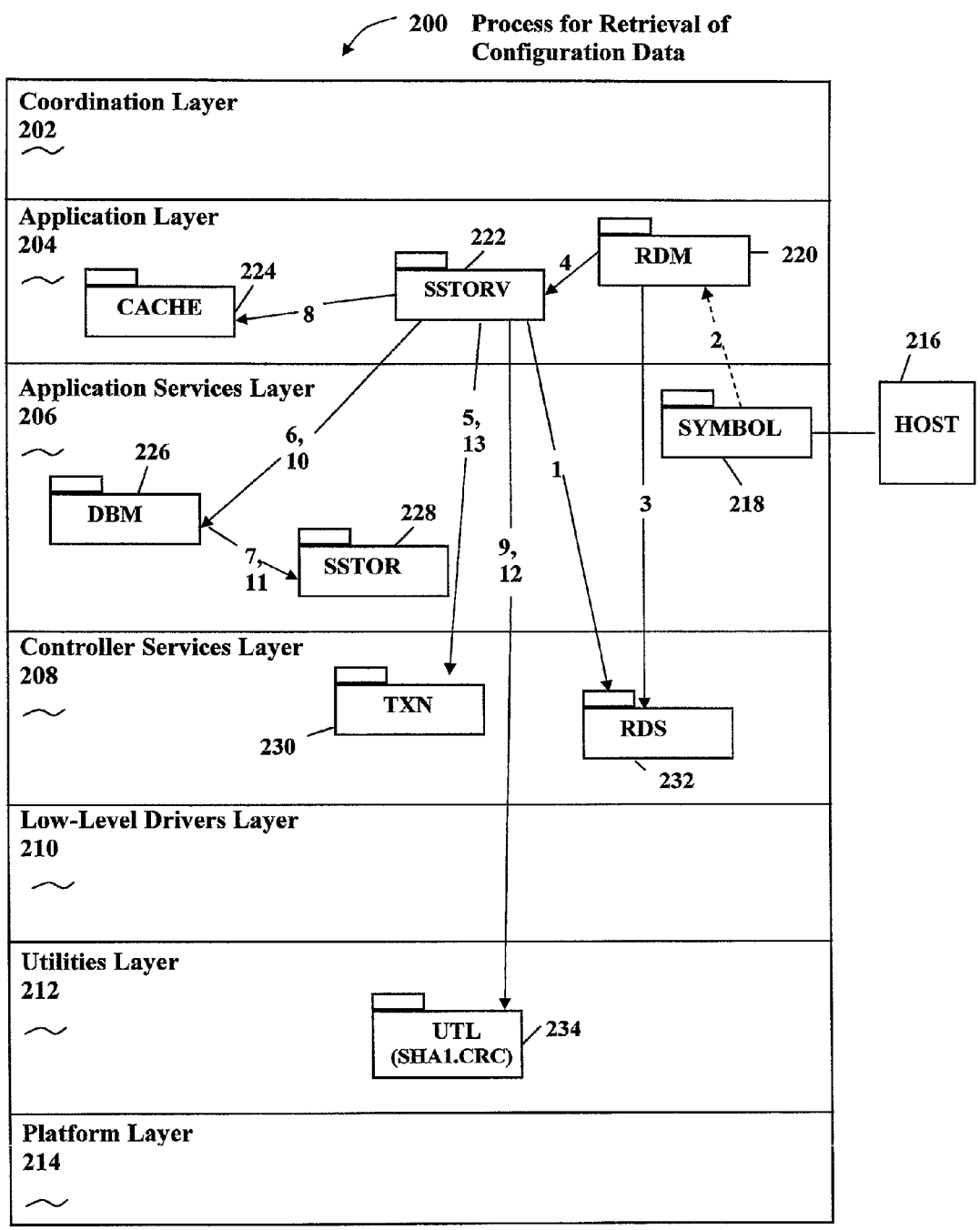
FIG. 2 is a work diagram illustrating modules that operate in various operational layers of a database management system.

FIG. 2 is a schematic diagram of the various software modules that are dispersed in the various software layers that illustrate the process 200 for retrieval of configuration data. The software layers comprise the coordination layer 202, the application layer 204, the application services layer 206, the controller services layer 208, the low-level drivers layer 210, the utilities layer 212 and the platform layer 214. As illustrated in FIG. 2, a host, such as host 216, communicates with the SYMBOL software module 218.

The first step in the process 200 of retrieval of the configuration data is that the SSTORV module 222 registers with the RDS module 232 as a service provider for the DBM database record and the retrieve/restore functions. In step 2, the SYMBOL module 218 receives a retrieve message from host 216 and forwards the retrieve message to the RDM module 220. The RDM module handles buffering and other high level functions. In the third step, the RDM module retrieves registration information from the RDS module 232. The registration information indicates that when a command for a database restore or retrieve is received, SSTORV module 222 is called in accordance with step 4. In other words, the contact information is provided in the form of registration information. So, RDM module 220, which handles the buffering for multiple clients and other simple commands, forwards the request for retrieval to SSTORV 222. In step 5, SSTORV creates a read-only transaction lock to ensure that only one controller is reading the data in the stable store region 120. The read-only configuration allows the alternate controller to keep reading from the database, but does not allow the alternate controller to write to the transactional database 116.

At step 6, SSTORV module 222 instructs DBM 226 to check the file systems, so that DBM 226 can look into the database 116 to determine if everything appears to be structurally correct.

At step 7, DBM module 226 reads the various blocks from SSTOR module 228 and checks the file system. At step 8, SSTORV module 222 allocates a scatter-gather list by calling cache module 224.

At step 9, SSTORV module 222 creates a header record and begins CRC accumulation of the entire data set. In this case, the data that is going to be sent to the host 216 has a header placed on the data. In addition, there is a CRC which is transmitted at the end of the data set. The CRC may comprise a redundancy check-sum.

At step 10, SSTORV module 222 reads client records from DBM module 226. At this step, records are being read from the database, which should be consistent and not corrupt. At step 11, the database manager module 226 reads blocks of data from SSTOR module 228.

At step 12, SSTORV module 222 creates a trailer record and completes the CRC process. Accordingly, at this step, the database data has been read and the trailer record at the end of the data transmits the check-sum CRC. At step 13, SSTORV module 222 deletes the transaction lock after the CRC check-sum has been stored to the database. At this point, the other controller and various other clients (hosts) 222, 228, and other software modules in the controllers, can start writing to the transactional database 116.

Figure 3:
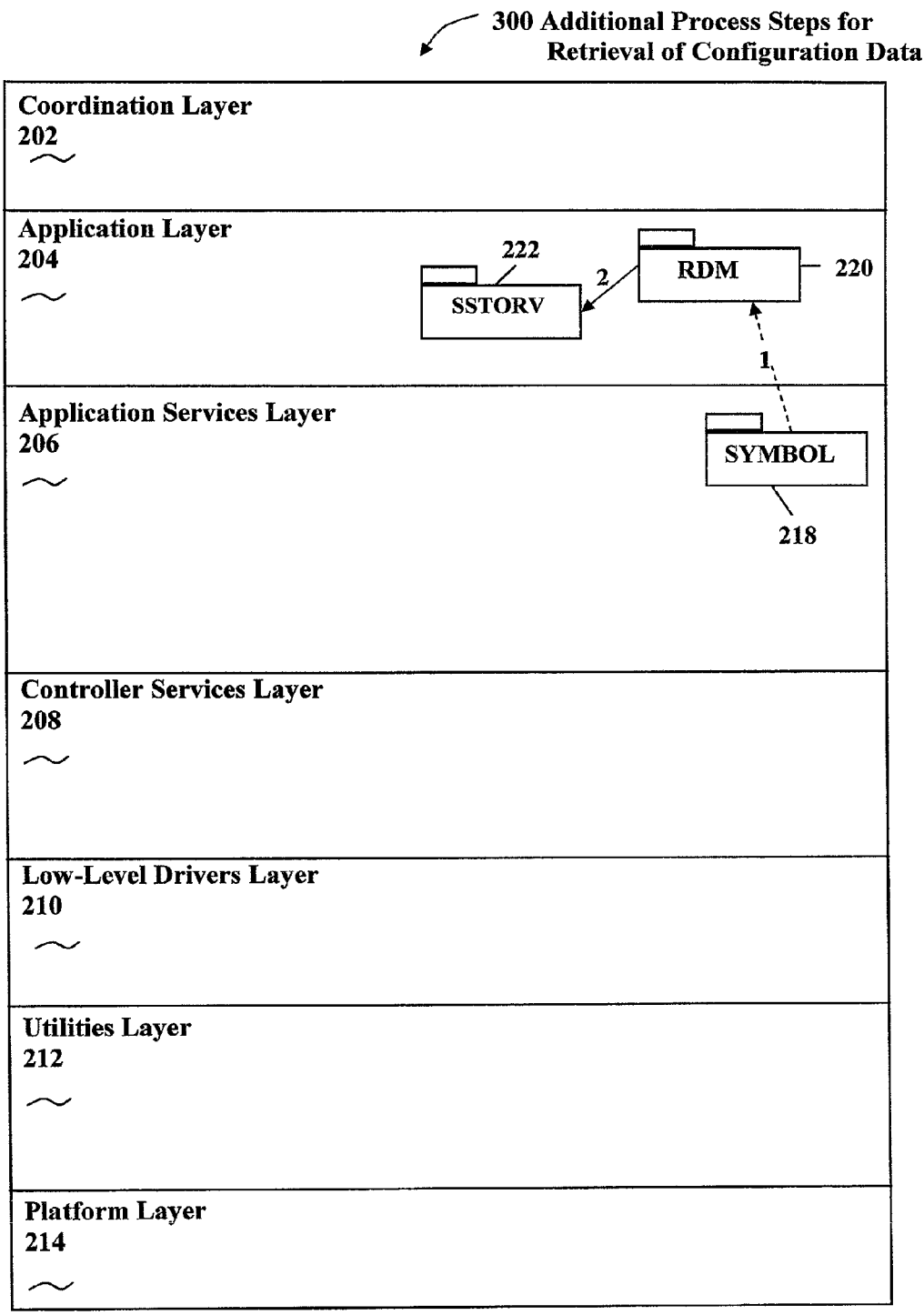
FIG. 3 is a work diagram showing additional process steps for retrieval of configuration data.

FIG. 3 shows additional process steps 300 for retrieval of configuration data. At step 1, the SYMBOL module 218 forwards a remote procedure call to RDM 220. At step 2, RDM 220 forwards a request to SSTORV 222, which returns the next subset of data by copying data from the SSTORV scatter-gather list into a buffer supplied by RDM module 220. Data is returned to the host at this point.

Figure 4:
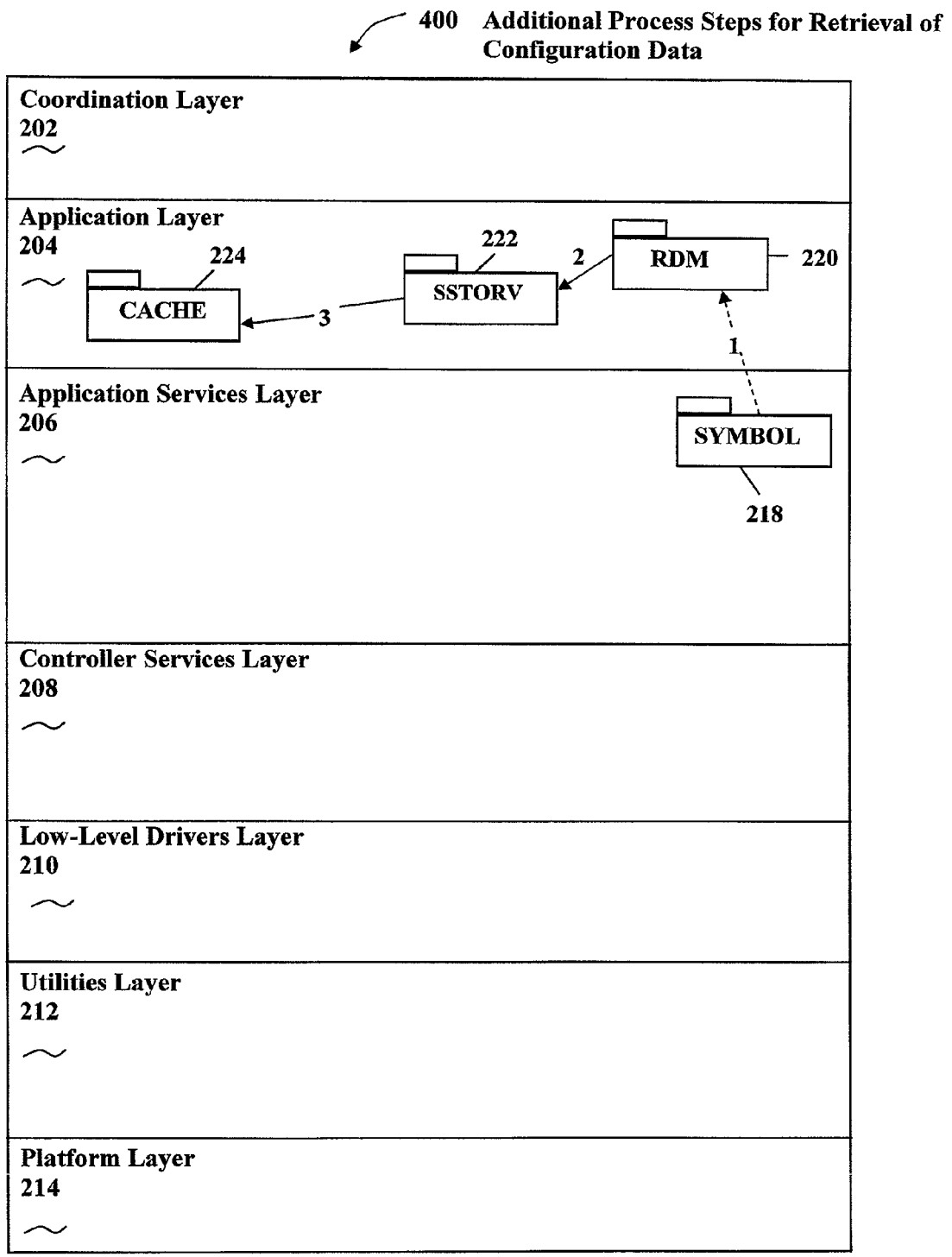
FIG. 4 is a schematic diagram of the additional process steps for retrieval of configuration data.

FIG. 4 is a schematic diagram of the additional process steps 400 for retrieval of configuration data. As illustrated in FIG. 4, SYMBOL module 218 forwards a remote procedure call to RDM 220. RDM 220 then forwards the request to SSTORV 222. In the third step, SSTORV sends a control signal to free the memory allocated by CACHE 224 after SSTORV has transferred all of the data.

Figure 5:
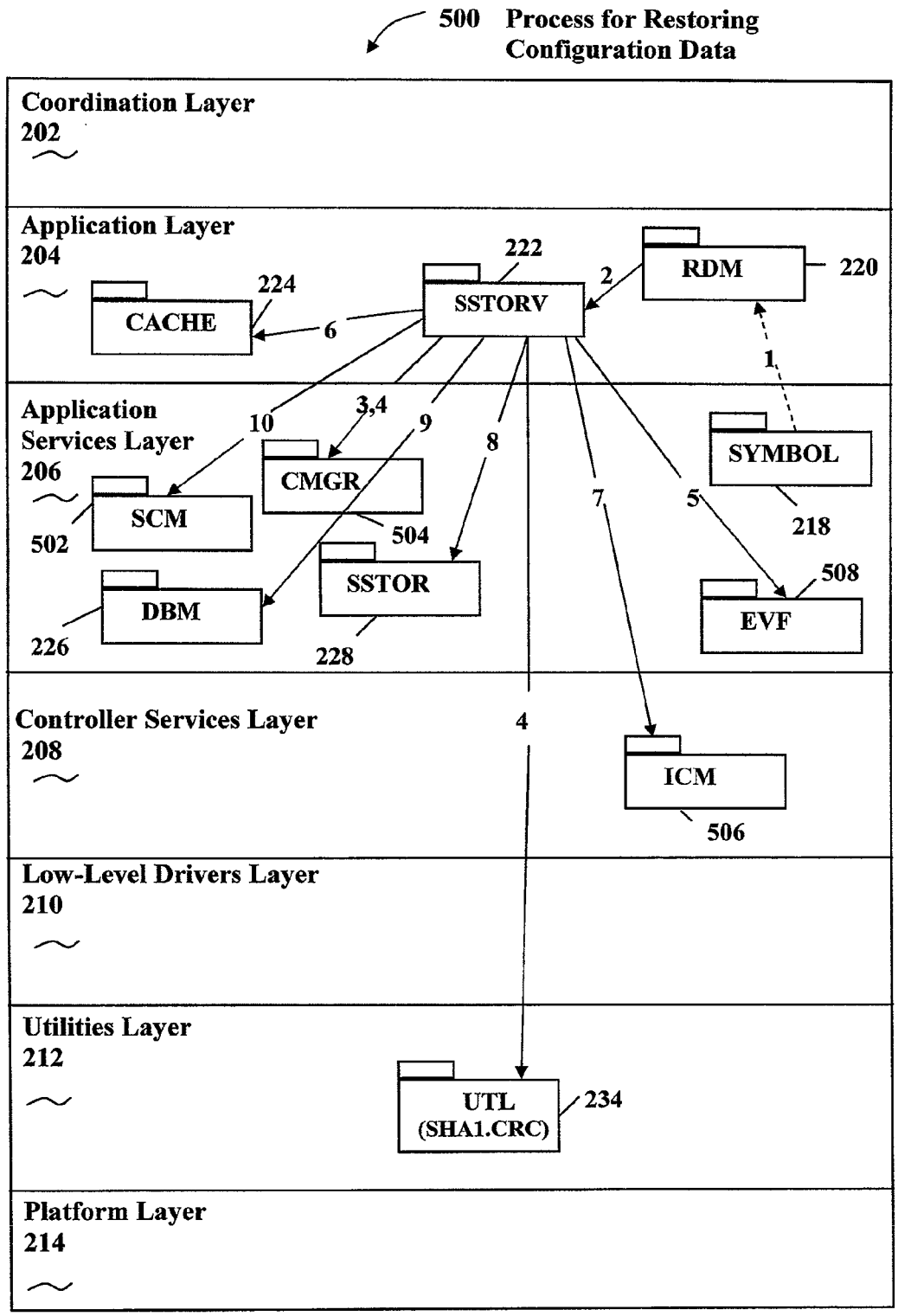
FIG. 5 is a schematic diagram illustrating a process for restoring configuration data.

FIG. 5 illustrates a process 500 for restoring configuration data. In the first step, the SYMBOL module 218 forwards a remote procedure call to RDM 220. In the second step, RDM 220 forwards a request to SSTORV 222. In the third step, SSTORV 222 queries CMGR 504 to ensure that the alternate controller is held in reset or is offline. CMGR 504 returns an error signal if the alternate controller is not held in reset or offline. This ensures that the alternate controller cannot be operated during a restore operation or otherwise becomes active. At step 4, SSTORV 222 compares a validator against the controller serial numbers stored in CMGR 504. If the serial numbers do not match, an error is returned, indicating that the database is not from this array. Alternatively, this step can be performed in the Finish Restore Sequence. At step 5, SSTORV 222 invokes controller quiescence via EVF 508. Invocation of controller quiescence is a transactional request. The controller must remain quiesced after the transaction is committed. In step 6, SSTORV 222 allocates cache memory based upon the size of the data set. At step 7, SSTORV 222 notifies ICM 506 that the array configuration is invalid. This procedure blocks all commands from SYMBOL 218 that could change the current configuration. At step 8, SSTORV 222 instructs SSTOR 228 to prepare for the restore operation. At step 9, SSTORV 222 instructs DBM 226 to temporarily place the database offline. In step 10, the configuration generation number is incremented in SCM 502.

Figure 6:
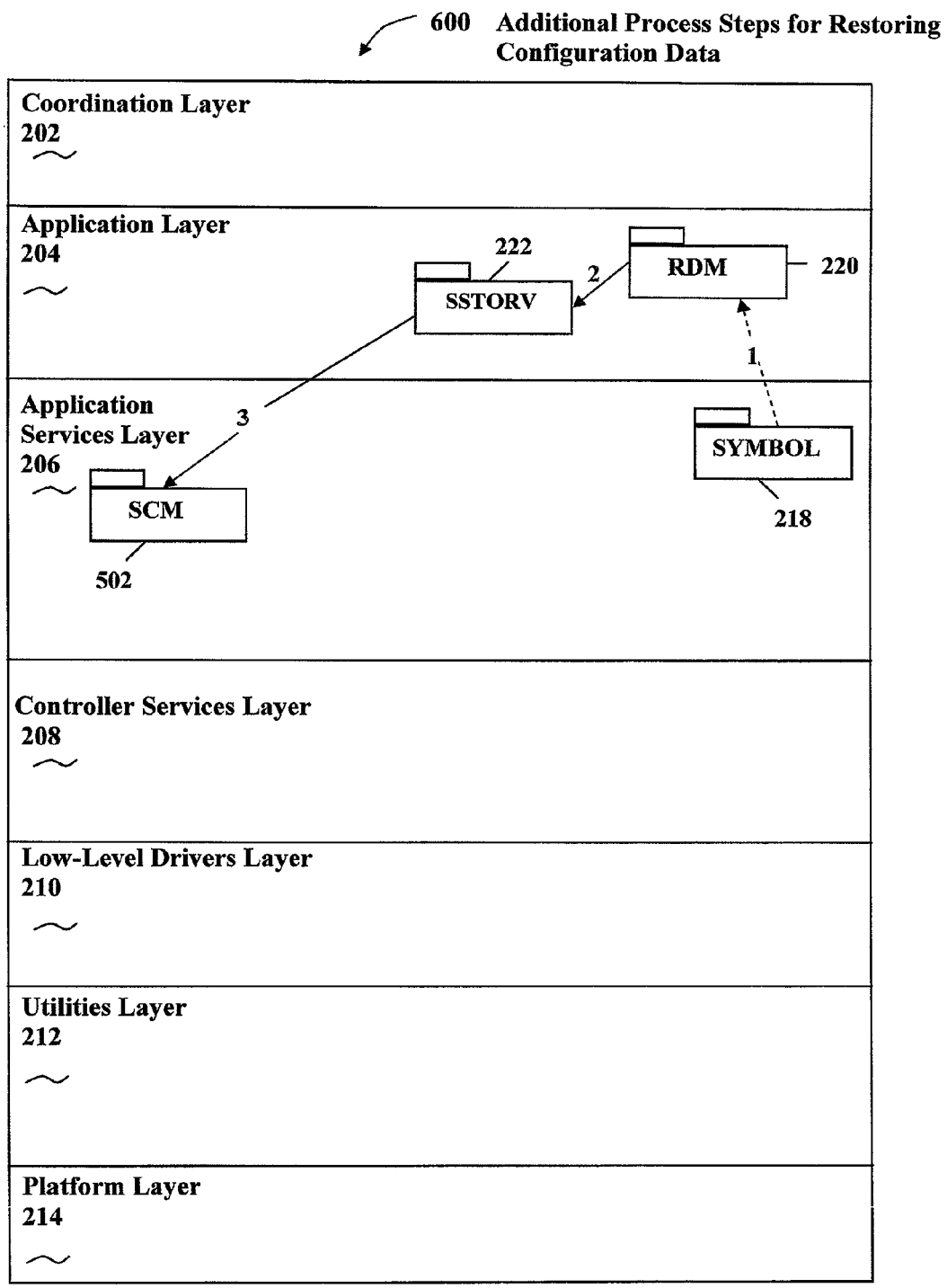
FIG. 6 is a schematic diagram illustrating an additional process step for restoring configuration data.

FIG. 6 illustrates additional process step 600 for restoring configuration data. At step 1, SYMBOL module 218 forwards a remote procedure call to RDM 220. At step 2, RDM 220 forwards the request to SSTORV 222. At step 3, SSTORV 222 accumulates data in pre-allocated SGL storage and increments a configuration generation number in SCM 502.

Figure 7:
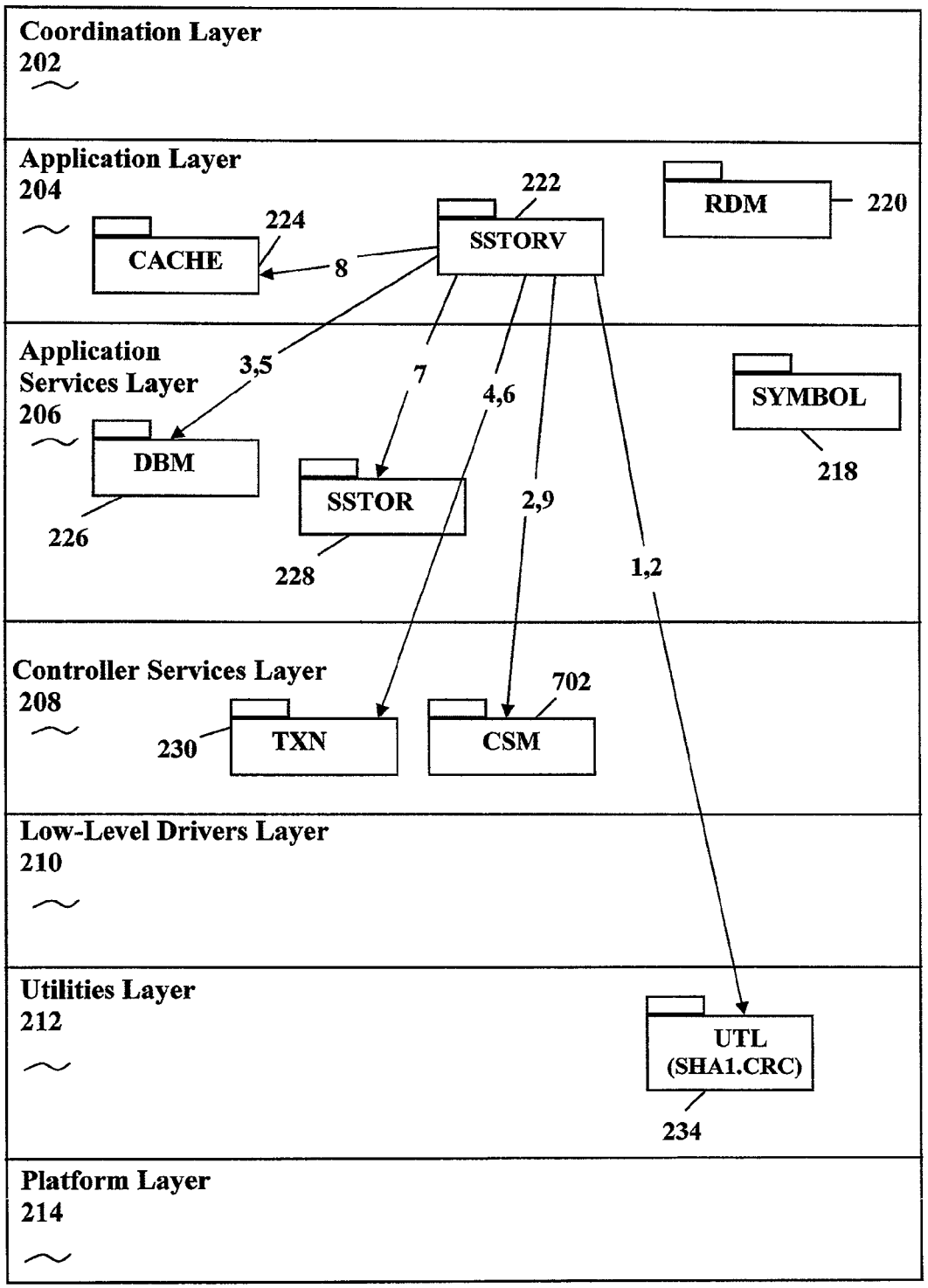
FIG. 7 shows the final process steps for restoring configuration data.

FIG. 7 shows the final process steps 700 for restoring configuration data. When SSTORV 222 recognizes that it has received the last packet of data from the host, SSTORV 222 will activate the newly installed database. In step 1, SSTORV validates the error detection CRC for the received data in UTL 234. In step 2, SSTORV 222 compares the validator against controller serial numbers stored in CMGR 504. If the validator does not match the serial numbers, an error signal is returned, indicating that the database is not from this array. In step 3, SSTORV instructs DBM 226 to initialize the database to the empty state. In step 4, SSTORV 222 creates a write transaction using TXN 230. At step 5, SSTORV 222 writes all records into a file system using DBM 226. At step 6, SSTORV 222 commits and deletes the transaction using TXN 230. At step 7, SSTORV 222 directs SSTOR 228 to activate the restore data and deactivate the remaining drive set. At step 8, SSTORV 222 releases the cache memory allocated by CACHE 224. At step 9, SSTORV 222 schedules a task using CSM 702 to delay a couple of seconds and then reboot the controller. The delay allows the request from SYMBOL 218 to be completed back to the host 216.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A storage system, comprising:
   a storage unit comprising a database accessible by a plurality of host systems for reading and writing data; and
   first and second storage controllers communicatively coupled between the host systems and the storage unit,
   wherein each of the storage controllers comprises a database manager operable to process input/output (I/O) requests to the database,
   wherein each of the storage controllers comprises a random access memory (RAM) operable to cache data of the I/O requests, and
   wherein the database manager of the first storage controller is operable to detect a first of the I/O requests from a first of the host systems, to determine a size of the first I/O request, to lock a portion of the database where the first I/O is directed based on the size of the first I/O request, to break the data of the first I/O request into a plurality of smaller portions, to store the smaller portions of data in the RAM of the first storage controller, to generate a scatter-gather list that identifies where the smaller portions of data are in the RAM of the first storage controller for access by the first host system, and to unlock the portion of the database in response to generating the scatter-gather list such that I/O requests to the portion of the database can resume.

2. The storage system of claim 1, wherein:
   the database manager of the first storage controller is further operable to present the scatter-gather list to the first host system such that the first host system can access the smaller portions of data after the portion of the database is unlocked.

3. The storage system of claim 1, wherein:
   the first and second storage controllers are communicatively coupled to one another.

4. The storage system of claim 3, wherein:
   the database manager of the first storage controller is further operable to detect an I/O request to the portion of the database by another host system through the second storage controller while the portion of the database is locked, and to invalidate the I/O request by the other host system.

5. The storage system of claim 4, wherein:
   the database manager of the second storage controller is operable to notify the other host system that its I/O request is invalid.

6. The storage system of claim 1, wherein:
   the first storage controller is further operable to hold the second storage controller in a reset mode until the portion of the database is unlocked.

7. The storage system of claim 1, wherein:
   the first and second storage controllers are further operable to implement a Redundant Array of Independent Disks (RAID) management on the storage unit.

8. The storage system of claim 1, wherein:
   the database manager of the first storage controller is further operable to generate a header indicating how many of the smaller portions of data exist in the RAM of the first storage controller.

9. The storage system of claim 1, wherein:
   the database manager of the first storage controller is further operable to generate a cyclic redundancy check for the smaller portions of data.

10. A method operable in a storage system comprising a storage unit with a database accessible by a plurality of host systems for reading and writing data and comprising first and second storage controllers communicatively coupled between the host systems and the storage unit, the method comprising, via a database manager of the first storage controller:
    detecting a first input/output (I/O) request from a first of the host systems;
    determining a size of the first I/O request;
    locking a portion of the database where the first I/O is directed based on the determined size of the first I/O request;
    breaking the data of the first I/O request into a plurality of smaller portions;
    storing the smaller portions of data in a random access memory (RAM) of the first storage controller; and
    generating a scatter-gather list that identifies where the smaller portions of data are in the RAM of the first storage controller for access by the first host system; and
    unlocking the portion of the database in response to generating the scatter-gather list such that other I/O requests by other host systems to the portion of the database can resume.

11. The method of claim 10, further comprising:
    via the database manager of the first storage controller, presenting the scatter-gather list to the first host system such that the first host system can access the smaller portions of data after the portion of the database is unlocked.

12. The method of claim 10, wherein:
the first and second storage controllers are communicatively coupled to one another; and
the method further comprises, via the database manager of the first storage controller, detecting another I/O request to the portion of the database by another host system through the second storage controller while the portion of the database is locked, and invalidating the other I/O request by the other host system.

13. The method of claim 12, further comprising:
via a database manager of the second storage controller, notifying the other host system that its I/O request is invalid.

14. The method of claim 10, further comprising:
holding the second storage controller in a reset mode until the portion of the database is unlocked.

15. The method of claim 10, further comprising:
via the database manager of the first storage controller, generating a header indicating how many of the smaller portions of data exist in the RAM of the first storage controller.

16. The method of claim 10, further comprising:
via the database manager of the first storage controller, generating a cyclic redundancy check for the smaller portions of data.

17. A non-transitory computer readable medium comprising instructions that, when executed by a first storage controller in a storage system, directs the first storage controller to:
detect a first input/output (I/O) request from a first of a plurality of host systems;
determine a size of the first I/O request;
lock a portion of a database in a storage unit of the storage system where the first I/O is directed based on the determined size of the first I/O request;
break the data of the first I/O request into a plurality of smaller portions;
store the smaller portions of data in a random access memory (RAM) of the first storage controller; and
generate a scatter-gather list that identifies where the smaller portions of data are in the RAM of the first storage controller for access by the first host system; and
unlock the portion of the database in response to generating the scatter-gather list such that other I/O requests by other host systems to the portion of the database can resume.

18. The computer readable medium of claim 17, further comprising instructions that direct the first storage controller to:
present the scatter-gather list to the first host system such that the first host system can access the smaller portions of data after the portion of the database is unlocked.

19. The computer readable medium of claim 17, wherein:
the first storage controller is communicatively coupled to a second storage controller; and
the computer readable medium further comprises instructions that direct the first storage controller to detect an I/O request to the portion of the database by another host system through the second storage controller while the portion of the database is locked, and to invalidate the I/O request by the other host system.

20. The computer readable medium of claim 19, further comprising instructions that direct the first storage controller to:
direct the second storage controller to notify the other host system that its I/O request is invalid.

21. The computer readable medium of claim 17, further comprising instructions that direct the first storage controller to:
hold the second storage controller in a reset mode until the portion of the database is unlocked.

22. The computer readable medium of claim 17, further comprising instructions that direct the first storage controller to:
generate a header indicating how many of the smaller portions of data exist in the RAM of the first storage controller.

23. The computer readable medium of claim 17, further comprising instructions that direct the first storage controller to:
generate a cyclic redundancy check for the smaller portions of data.

* * * * *